Feb. 4, 1958 J. T. ANDERSON 2,822,273
BEVERAGE MAKER
Filed Sept. 14, 1953
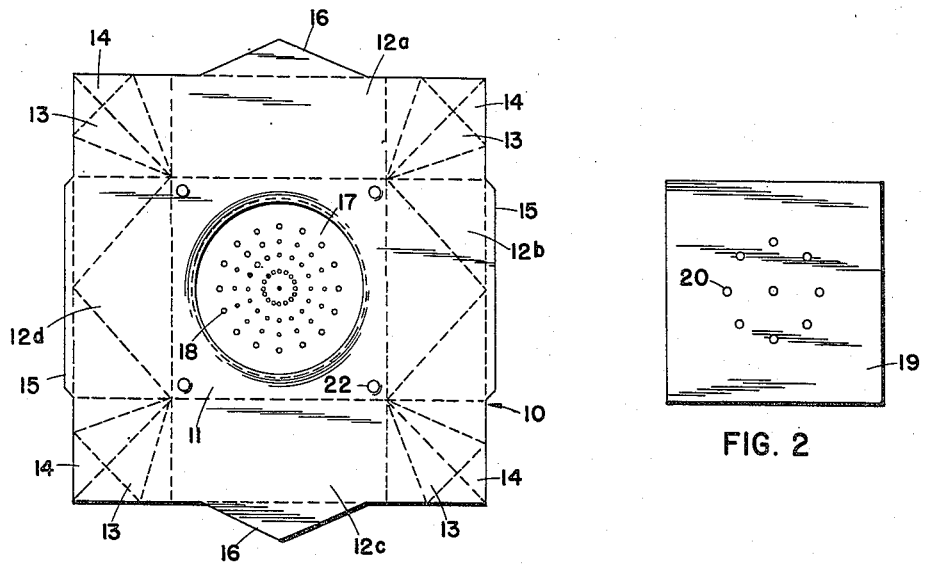
FIG. 1
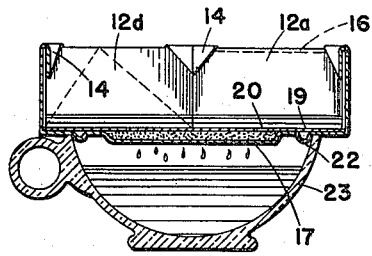
FIG. 2
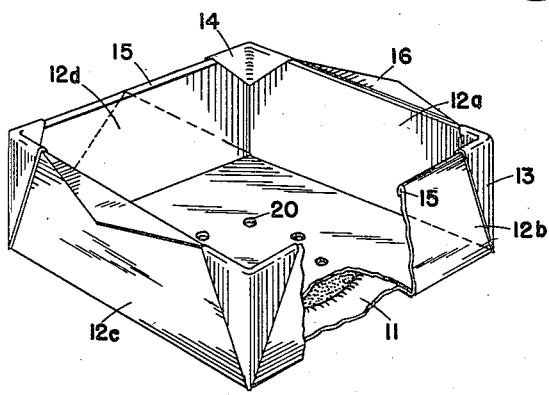
FIG. 3
FIG. 5
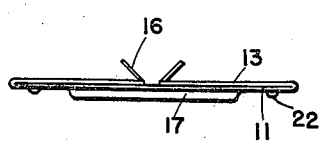
FIG. 4
INVENTOR
JAMES T. ANDERSON
BY
ATTORNEY

United States Patent Office 2,822,273
Patented Feb. 4, 1958

2,822,273

BEVERAGE MAKER

James T. Anderson, Garrison, N. Y.

Application September 14, 1953, Serial No. 379,868

6 Claims. (Cl. 99—77.1)

This invention relates to beverage makers, and more particularly to a disposable beverage maker by which a predetermined quantity of a beverage of predetermined strength may be made without requiring measurement of any of the constituents thereof by the user. While the beverage maker of this invention has been developed primarily as a coffee maker, it will of course be apparent from a consideration of the following disclosure that it may be used with solutes other than ground coffee for the making of other beverages.

While coffee is available in powdered as well as concentrated liquid form, which permits the making of relatively small size individual portions of the beverage, many feel that the beverage made from such solutes is not comparable with, or at least is readily distinguishable from, the beverage made from ground coffee. Yet heretofore there has been available no device by which small, individual portions of a beverage can be made which is either the same in taste as the beverage made by conventional coffee makers such as percolators, drip coffee pots, etc., or which is not readily discernible therefrom. Hence, in order to fulfill the desires of those who insist on the beverage made from ground coffee and who wish to be able to make it in small, individual portions or amounts sufficient for but a small number of individual portions, I have developed the beverage maker of this invention which, in addition to being very compact in size, is disposable after a single use.

A beverage maker according to my invention comprises broadly a collapsible receptacle adapted to receive a predetermined measured quantity of solvent, e. g. water, and an enclosed container, which is attached to the bottom thereof, adapted to contain a predetermined measured quantity of solute such as ground coffee. The bottom wall of the container as well as the bottom of the receptacle each contain a plurality of holes or perforations, the bottom of the receptacle forming the top wall of the solute container. The device as distributed to the user will contain in the container portion thereof a predetermined measured quantity of the solute or solute-containing material, such as ground coffee, the size of the collapsible receptacle being such, relative to the amount of solute contained by the device, that the solvent which it will receive will, when passed through the solute-containing container, give a beverage of predetermined strength. The size of the composite device may be such that any predetermined quantity of beverage may be made thereby; for example, devices might be made by which one, two, three or more cups of beverage may be made.

Other features of my invention will be apparent from the following detailed description of a specific embodiment thereof taken in connection with the accompanying drawing, in which:

Fig. 1 is a plan view of a blank from which the major portion of this embodiment of the invention may be formed;

Fig. 2 is a plan view of a separator adapted to overlie the solute or solute-containing material in the complete device;

Fig. 3 is a perspective view of the complete device in extended form;

Fig. 4 is a cross sectional view of the device in collapsed form; and

Fig. 5 is a cross sectional view of the device in expanded form resting on the rim of a cup.

A blank 10, from which the major portion of a beverage maker according to my invention may be formed, comprises a sheet of any suitable material scored, as shown in Fig. 1, to provide a bottom portion 11, side wall portions 12a, 12b, 12c and 12d and corner sections 13. The corner sections 13 are also scored to accommodate folding of the blank and are each provided with flap sections 14 which may be folded inwardly when the blank is folded into the desired shape, as indicated in Fig. 3, to maintain the blank in such desired shape. Opposite side wall portions 12b and 12d are also scored to accommodate collapsing of the folded blank whereby it can be compacted for packaging and shipping. These side wall portions additionally are provided with reinforcing edge sections 15 by which they are strengthened when the blank has been folded to the shape indicated in Fig. 3. The other side walls 12a and 12c have tab sections 16 which may be manually grasped when the device is in compacted form, as illustrated in Fig. 4, and expanded.

A depressed section 17 containing a plurality of perforations 18 is formed in the bottom section 11 of the blank. This depressed portion 17 is adapted to contain a measured quantity of solute or solute-containing material such as ground coffee. When the blank 10 is folded to the shape illustrated in Fig. 3 and a measured quantity of material is deposited in section 17 of the bottom thereof, a separator 19 (Fig. 2) is pressed downwardly therein to overlie the solute or solute-containing material. Separator 19 is also provided with a plurality of perforations 20. These perforations are preferably somewhat larger than are perforations 18 and are related in size and number to perforations 18 so that more solvent (in the case of a coffee maker, water) may pass through the separator in a given time than will pass through the bottom 11 of the blank 10. The size of the separator 19 may either be such that it fits very tightly within the walled blank, or in the alternative it may be secured therein to bottom 11 of blank 10 by a suitable adhesive at points around its peripheral section. While it has been indicated that the blank 10 is first folded to the shape illustrated in Fig. 3, the solute or solute-containing material then placed in section 17 thereof and the separator 19 then inserted, the sequence of steps by which the device is formed is of course immaterial except insofar as it may be more convenient and economical to employ one sequence than another.

The chamber formed by the bottom 11 of blank 10 and the separator 19 which contains the solute or solute-containing material may be referred to as a solute container. In this instance the separator 19 then may be considered as forming the bottom of the liquid receptacle, the remainder of which is formed by its side walls 12a, 12b, 12c and 12d.

As will be clear from what has been said above, the volumetric size of the solvent receptacle and that of the solute-container (depressed section 17) are so related that for a given quantity of a particular solute the amount of solvent receivable by the receptacle will be just sufficient so that when passed through the solute a beverage will be made of desired strength. While I have in mind particularly a device suitable for making a one-cup quantity of a beverage, it will of course be clear that the amount of beverage that may be made depends upon the size of the device, including of course the sizes of the solvent receptacle portion thereof and the solute container portion thereof.

As was previously indicated, it is contemplated that the device containing the solute or solute-containing material will be marketed in the form and condition illustrated in Fig. 4. For use, the solvent receptacle portion of the device may merely be expanded by grasping tabs 16 and pulling them apart. The device is then held over or rested upon the upper lip of a beverage container such as a coffee cup 23 and the solvent poured into the open upper end of the receptacle portion thereof. This is illustrated in Fig. 5.

Preferably the lateral dimension of the device is such that at least the diagonal measurement thereof is greater than the diameter of the rim of a cup of standard size. To facilitate positioning of the device on the rim of a cup or other beverage container, projections 22 may be pressed from the bottom 11 of the blank 10 adjacent the corners thereof. In addition to facilitating positioning of the device on a beverage receptacle, these projections 22 will prevent sufficient movement thereof on the rim of the receptacle to cause the device to fall into the receptacle.

In distributing certain beverage solutes or solute-containing material, particularly coffee, it is desirable, if not essential, that the material be maintained fresh substantially to the time of use. To provide for this in the present instance, it is contemplated that each of the devices may be individually wrapped in a moisture-proof material such as cellophane or polyethylene sheet.

Where the term "solute" has been used herein and is used in the following claims, it is intended to include either a solute which will dissolve entirely in a solvent or a solute-containing material which, when subjected to a solvent, may leave an undissolved residue.

Various changes and modifications may of course be made in the device illustrated and described in detail above without departing from my invention, the scope of which is rather to be limited only to the extent set forth in the appended claims.

I claim:

1. A disposable beverage maker comprising a collapsible solvent receptacle having a bottom and four side walls, a solute container at the bottom of said receptacle, and a measured quantity of solute in said solute container, the bottoms of said receptacle and said container each containing a plurality of perforations therethrough and the bottom of said receptacle forming the top of said container, each of a pair of opposite side walls of said receptacle having scorings therein to permit folding of the receptacle so that the side walls will lie substantially flat upon the bottom of the receptacle.

2. A disposable beverage maker according to claim 1 which includes a manually engageable tab at the upper edge of each of the other pair of side walls of the receptacle.

3. A disposable beverage maker according to claim 1 in which said pair of side walls of said receptacle are scored to permit folding of said side walls inwardly only.

4. A disposable beverage maker according to claim 3 in which the side walls are folded inwardly, and which includes a wrapping of moisture-proof material completely enclosing the folded solvent receptacle and solute container.

5. A beverage maker according to claim 4 in which the solute is ground coffee.

6. A disposable beverage maker comprising a collapsible solvent receptacle having bottom and side walls, a solute container at the bottom of the receptacle, and a measured quantity of solute in said solute container, the bottoms of the receptacle and the container each being porous and the bottom of the receptacle forming the top of the container, said receptacle having scorings in its side wall or walls to permit folding thereof to lie substantially flat upon the bottom of the receptacle.

References Cited in the file of this patent

UNITED STATES PATENTS

| 1,412,388 | Clermont | Apr. 11, 1922 |
| 1,454,739 | Holland | May 8, 1923 |
| 1,456,010 | Richheimer | May 22, 1923 |
| 1,876,474 | Starkey | Sept. 6, 1932 |
| 1,947,523 | Hirschhorn | Feb. 20, 1934 |
| 2,539,771 | Chambers | Jan. 30, 1951 |
| 2,615,384 | Ranz | Oct. 28, 1952 |
| 2,743,664 | Dale | May 1, 1956 |

FOREIGN PATENTS

| 812,235 | France | May 3, 1937 |
| 660,983 | Great Britain | June 8, 1938 |
| 902,986 | France | Sept. 18, 1945 |